United States Patent [19]

Gaudreau et al.

[11] Patent Number: 4,860,460
[45] Date of Patent: Aug. 29, 1989

[54] APPARATUS FOR HEATING ARTICLES

[75] Inventors: Paul D. Gaudreau, No. Attleboro, Mass.; J. Gordon Hickling, San Clemente, Calif.; Howard E. Schachter, Providence, R.I.

[73] Assignee: Electraflo Technology Corp., North Attleboro, Mass.

[21] Appl. No.: 162,036

[22] Filed: Feb. 29, 1988

[51] Int. Cl.[4] .............................................. F26B 21/06
[52] U.S. Cl. ............................................. 34/26; 34/78
[58] Field of Search .................... 34/78, 72, 23, 32, 68, 34/73, 26, 27; 432/194, 197

[56] References Cited

U.S. PATENT DOCUMENTS

| | | | |
|---|---|---|---|
| 4,698,915 | 10/1987 | Dickinson | 34/78 X |
| 4,735,001 | 4/1988 | Mishina et al. | 34/78 X |
| 4,759,710 | 7/1988 | Polaczy et al. | 34/78 X |
| 4,766,677 | 8/1988 | Brooks et al. | 34/78 |

Primary Examiner—Henry A. Bennet
Attorney, Agent, or Firm—Salter & Michaelson

[57] ABSTRACT

An apparatus for heating articles includes a main heating vessel having an inlet opening, an outlet opening and an exhaust opening therein, a quantity of a vaporizable heat transfer liquid in the vessel, a heating unit for heating the heat transfer liquid to produce a vapor blanket in the vessel, a transport assembly for transporting an article to be heated so that it passes through the vapor blanket and a control for controlling the heating unit to maintain the height of the vapor blanket at a predetermined level. The inlet opening, the outlet opening and the exhaust opening are all at least partially above the upper level of the vapor blanket, and an exhaust fan is provided for withdrawing air from the main heating vessel so that air is continuously drawn inwardly through the inlet opening and the outlet opening to prevent loss of vaporized heat transfer medium from the vessel. The air which is withdrawn from the heating vessel and any of the heat transfer medium intermixed therewith are passed through a recovery section where the air and heat transfer medium are intermixed with water to recover the heat transfer medium from the air.

12 Claims, 1 Drawing Sheet

APPARATUS FOR HEATING ARTICLES

BACKGROUND AND SUMMARY OF THE INVENTION

The instant invention relates to heating apparatus for use in heating articles and more particularly to an apparatus for heating articles utilizing a vaporized heat transfer medium.

Processes wherein articles are heated utilizing vaporized heat transfer media have been generally known for a number of years. More specifically, processes of this type have been known and have generally been found to be effective for use in various reflow processes wherein soldering or brazing compounds are heated to temperatures above the melting points thereof to form soldered or brazed connections. In particular, processes of this type have been found to be highly effective for use in reflow soldering operations wherein solder is melted to form soldered joints between electrical components on printed circuit boards and the like. In this specific application, perfluorinated liquids have been widely used and have been found to be highly effective heat transfer media.

While heating apparatus which use vaporized heat transfer media, such as perfluorinated compounds, have been found to be highly effective for use in reflow soldering operations, they have generally been found to have excessively high operating costs, primarily due to the fact that they have been prone to relatively high vapor losses. In this connection, the heretofore available apparatus for carrying out processes of this type have generally comprised heating vessels containing quantities of vaporized heat transfer media for heating articles as they are passed therethrough. Apparatus of this type have generally been adapted for continuous operations, and hence they have generally had normally open inlet and outlet openings to enable articles to be passed therethrough. It has been found that substantial quantities of vaporized heat transfer media are often lost through the open inlet and outlet openings of the heating vessels of apparatus of this type as articles are passed into or removed from the vessels. In this regard, it has been found that due to the extremely high cost of certain types of heat transfer media, such as perfluorinated liquids, vapor losses can represent significant cost factors in solder reflow processes. It has also been found that the vapors which are lost in heat transfer processes of this type can be environmentally harmful.

In addition to the problem of vapor losses, it has been found that many of the heretofore available vapor heating apparatus have been prone to accumulating moisture in the heating vessels thereof, and it has been further found that accumulated moisture can detract from the effectiveness of most vaporized heat transfer media, particularly those generated from perfluorinated liquids. In this connection, many of the heretofore available heating apparatus have included cooling coils in the main vessels thereof for containing the vapor blankets thereof, and it has been found that the cooling coils in heating apparatus of this type can cause moisture condensation. Further, it has been found that the configurations of the heating vessels of most of the heretofore available apparatus of this type inherently cause moisture to be accumulated therein rather than passing outwardly through the inlet or outlet openings thereof.

Heating apparatus representing the closest prior art to the subject invention of which the applicant is aware are disclosed in the PFAHL JR. et al, U.S. Pat. Nos. 3,866,307; CHU et al, 3,904,102; PFAHL, JR., 3,947,240; SHARVINKO et al, 4,022,371; CHU et al, 4,032,033; CHU et al, 4,055,217; SPIGARELLI, 4,077,467; CHU et al, 4,090,843; and AMMANN et al, 4,115,601. However, while some of the devices disclosed in these references have generally addressed the problem of reducing the losses of heat transfer media, none of them have effectively solved this problem. They have also not solved the problem of moisture accumulation. Accordingly, these references are believed to be only of general interest with respect to the instant invention, and the apparatus of the instant invention is believed to represent a significant improvement over the devices disclosed in these references.

The instant invention provides an effective apparatus for heating articles utilizing a vaporized heat transfer medium wherein the losses of the vaporized heat transfer medium are essentially eliminated. Specifically, the apparatus of the instant invention comprises a vessel having an exhaust opening therein and having inlet and outlet openings therein which are open to the atmosphere. The apparatus further comprises a quantity of vaporizable liquid heat transfer medium in the vessel, the heat transfer medium being of a type which is vaporizable to produce a vapor having a density greater than that of air, and means for heating the heat transfer medium to produce a vapor blanket of vaporized heat transfer medium in the vessel. The apparatus further comprises means for controlling the vapor blanket to maintain the upper extremity thereof at a predetermined level, and the apparatus is constructed so that portions of the inlet opening, the outlet opening and the exhaust opening are above the predetermined level of the vapor blanket. Still further the apparatus comprises exhaust means for applying a partial vacuum to the vessel through the exhaust opening in order to slowly withdraw air and any of the heat transfer medium intermixed therewith from the vessel, and transport means for transporting articles through the vessel so that they pass inwardly through the inlet opening, through the vapor blanket and then outwardly through the outlet opening. The preferred embodiment of the apparatus further comprises recovery means for recovering any of the heat transfer medium intermixed with the air which is withdrawn from the vessel through the exhaust opening, the recovery means preferably comprising spaced, coaxial inner and outer, substantially upright columns, a plurality of contact pins between the inner and outer columns and means for supplying water to the inner column so that the water spills out the upper end thereof and passes between the inner and outer columns. In this embodiment of the apparatus, the exhaust means is operative for drawing air and any of the heat transfer medium intermixed therewith upwardly between the inner and outer columns to intermix the heat transfer medium with the water while the air is drawn upwardly from between the columns by the exhaust means. The apparatus preferably further includes cooling means in the vessel above the predetermined level of the vapor blanket for cooling the portions of the vessel which are above the vapor blanket, and the vessel is preferably constructed so that it includes an upper portion which is disposed above both the inlet opening and the outlet opening. The exhaust opening is preferably disposed in the upper portion of the vessel, and the cooling means is preferably operative for cooling the upper portion. Still further, the apparatus preferably includes inlet and outlet tunnels which communicate with the inlet and outlet openings, respectively, and the inlet and outlet tunnels are preferably open to the atmosphere, although each preferably includes a segment which is entirely above the predetermined level of the vapor blanket in the vessel.

It has been found that the heating apparatus of the instant invention effectively solves the problem of preventing the loss of heat transfer medium. Specifically, because the inlet opening, the outlet opening, and the exhaust opening are all at least partially above the predetermined level of the upper extremity of the vapor blanket, it is possible to produce a positive inward flow of air through the inlet opening and the outlet opening. Accordingly, when a partial vacuum is applied to the vessel by the exhaust means, air flows inwardly through the inlet opening and the outlet opening to prevent vaporized heat transfer medium from passing outwardly through these openings. Further, because the apparatus preferably includes recovery means for recovering any of the heat transfer medium entrained in the air which is withdrawn from the vessel through the exhaust opening, it is possible to recover virtually all of the heat transfer medium which is withdrawn from the vessel and to exhaust air which is essentially pure. Still further, because there is a constant flow of air through the apparatus, any moisture which is contained in the air is also withdrawn so that moisture cannot accumulate or condense in the main vessel of the apparatus.

As a result, it is a primary object of the instant invention to provide an apparatus for heating articles utilizing a vaporized heat transfer medium wherein the loss of heat transfer medium is minimized.

Another object of the instant invention is to provide an apparatus for heating articles utilizing a vaporized heat transfer medium wherein moisture buildup is eliminated.

An even further object of the instant invention is to provide an apparatus for soldering electrical components on printed circuit boards utilizing a vaporized heat transfer medium wherein the loss of heat transfer medium is minimized.

A still further object of the instant invention is to provide an apparatus for heating articles utilizing a vaporized heat transfer medium comprising a vessel having an inlet opening, an outlet opening, and an exhaust opening and a vapor blanket in the vessel, wherein air is constantly drawn inwardly through the inlet and outlet openings and withdrawn through the exhaust opening.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
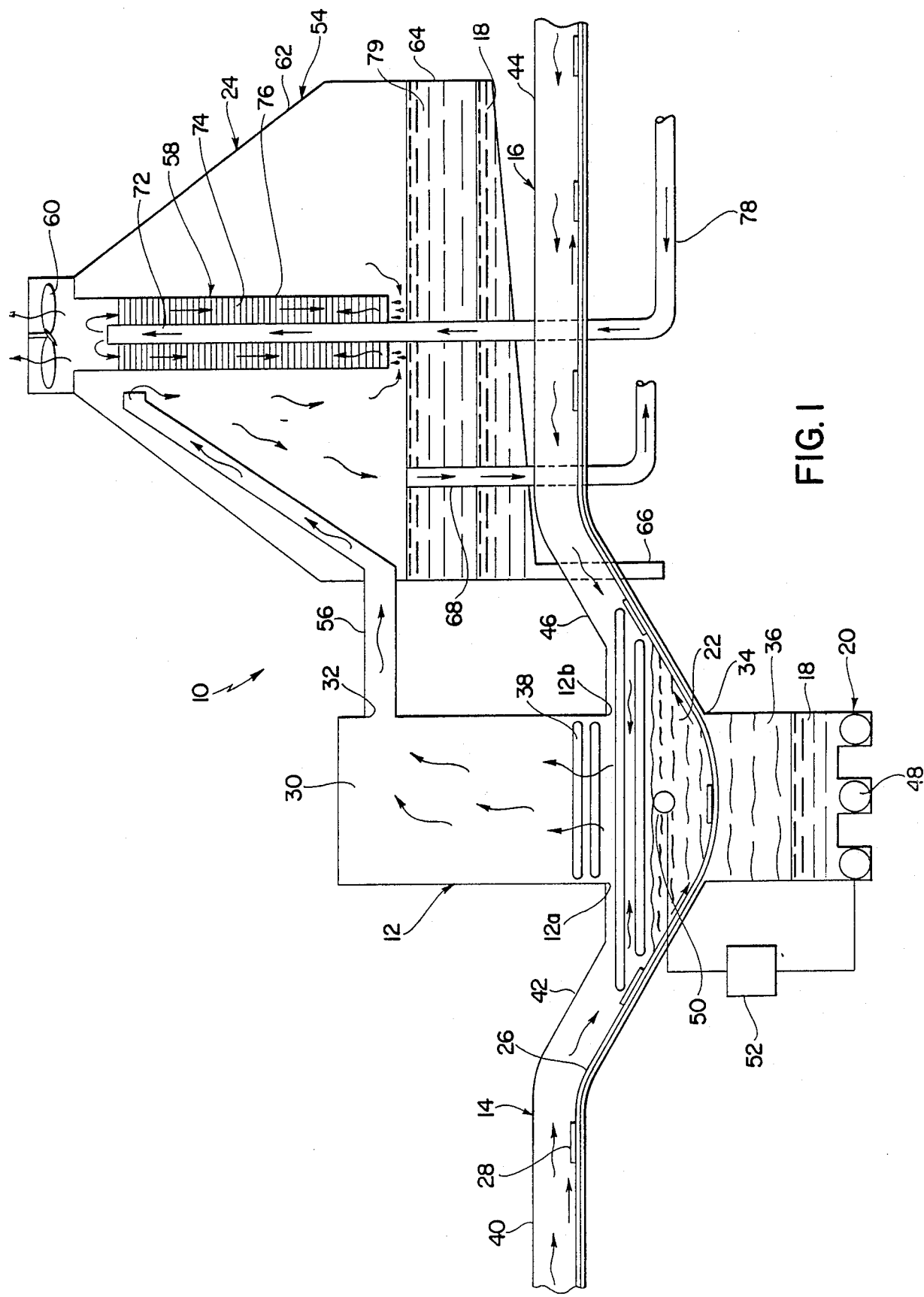
FIG. 1 is a schemmatic view illustrating the apparatus of the instant invention.

Referring now to the drawing, the apparatus of the instant invention is illustrated in FIG. 1 and generally indicated at 10. The apparatus 10 comprises a main vessel or housing generally indicated at 12 having inlet and outlet openings 12a and 12b, respectively, an inlet section generally indicated at 14, an outlet section generally indicated at 16, a quantity of liquid heat transfer medium 18 in the main vessel 12, and a heater assembly generally indicated at 20 which is operative for heating the liquid heat transfer medium 18 in order to produce a vapor blanket 22 of vaporized heat transfer medium in the main vessel 12. The apparatus 10 further comprises a recovery section generally indicated at 24 which is operative for applying a slight vacuum to the main vessel 12 and for recovering any vaporized heat transfer medium which is withdrawn from the main vessel 12. The apparatus 10 still further comprises a conveyor 26 which is operative for transporting articles 28 so that they pass through the vapor blanket 22 in order to heat the articles 28 to a predetermined level for effecting a reflow of solder on the articles 28. In this regard, the articles 28 preferably comprise printed circuit boards or the like having quantities of solder thereon and the articles are heated in the appartus by the vapor blanket 22 so that the solder on the article is heated and then resolidified to effect various predetermined electrical connections in the articles 28.

The main vessel 12 comprises a vessel which is preferably constructed from a suitable stainless steel, and it includes an upper section 30 having an exhaust opening 32 therein, an intermediate section 34 through which the inlet and outlet sections 14 and 16, respectively, communicate with the vessel 12, and a lower section 36. The lower section 36 is formed to provide a reservoir for containing a supply of the liquid heat transfer medium 18 as well as a portion of the vapor blanket 22. Provided in the interior of the housing 12 above the vapor blanket 22 is a plurality of cooling coils 38 which are preferably cooled by a suitable cooling medium, such as water. The cooling coils 38 are preferably positioned in closely adjacent relation to the walls of the vessel 12 in order to effect cooling thereof as well as cooling of any gases passing into the upper portion 30 of the vessel 12.

The inlet section 14 is preferably constructed from a suitable stainless steel in a tunnel-like configuration and it includes an inlet end (not shown) which is open to the atmosphere. The inlet section 14 preferably includes an upper portion 40 and a transition portion 42 which extends downwardly from the upper portion 40 to the intermediate section 34 of the vessel 12. In this regard, the upper portion 40 is preferably disposed entirely above the inlet opening 12a in order to minimize vapor losses from the vessel 12. The inlet section 40 may include various heating elements (not shown), such as electrically energized radiant heating elements, for preheating the articles 28, depending on the particular application.

The outlet section 16 is preferably also formed in a tunnel-like configuration from a stainless steel; and it has an outlet end which is open to the atmosphere. The outlet section 16 preferably includes an upper portion 44 and a transition portion 46 which extends upwardly from the vessel 12 to the upper portion 44. Further, the upper portion 44 is preferably disposed entirely above the outlet opening 12b from the vessel 12 in order to minimize vapor losses from the vessel 12.

The heat transfer medium 18 preferably comprises a suitable heat transfer medium having physical properties which enable it to meet the desired heating needs of a particular heating application. The heat transfer medium 18 preferably has a boiling point which is equal to the desired temperature of the vapor blanket 22. Further, the heat transfer medium 18 is preferably insoluable in water, it is preferably heavier than water, and it is preferably vaporizable to produce a vapor having a density which is greater than that of air in order to prevent the vapor blanket 22 from mixing to any significant extent with the air which is withdrawn from the housing 12. It has been found that a heat transfer liquid sold by the Minnesota Mining & Manufacturing Company under the trademark FLUORINERT FC-70 is highly effective for most reflow soldering operations, and hence the heat transfer medium 18 in the embodiment herein set forth preferably comprises FLUORINERT FC-70. In this connection, FLUORINERT FC-70 is essentially insoluable in water, it is heavier than water, and it has a vapor density at atmospheric pressure of 1.27 lbs per cubic feet; and hence it can be effectively utilized for forming a vapor blanket which does not readily mix with air to any significant extent. Further, FLUORINERT FC-70 has a boiling point at atmospheric pressure of 215° C., and hence it can be effectively utilized for melting most electrical solder compositions. It will be understood, however, that the use of a variety of other heat transfer media in the apparatus 10 for various other specific applications is contemplated.

The vapor blanket 22 preferably comprises a saturated vapor of the liquid heat transfer medium 18, and it is operative for transferring heat to the articles 28 via condensation in a conventional manner as the articles 28 are passed through the vapor blanket 22. In this connection, since the vapor blanket 22 is normally at equilibrium with the liquid heat transfer medium 18, the vapor blanket 22 is normally at a temperature which is equal to the boiling point of the heat transfer medium 18 (approximately 215° C. when the liquid 18 comprises FLUORINERT FC-70). The upper level or extremity of the vapor blanket 22 is normally relatively well defined; although a transition layer of aerosol comprising a mixture of vaporized heat transfer medium and air normally exists above the vapor blanket 22. However, since the aerosol layer is not in a vapor liquid equilibrium with the liquid heat transfer medium 18, it is normally substantially cooler than the vapor blanket 22.

The heater assembly 20 comprises a heater including a plurality of heater coils 48, a thermocouple 50, and a thermostatic controller 52. The heater coils 48 preferably comprise electrically energizable incoly heating elements of low watt desensity, and they are operative for heating the liquid heat transfer medium 18 to produce the vapor blanket 22 of heat transfer medium. The thermocouple 50 comprises a conventional thermocouple, and it is positioned in the intermediate section 34 of the housing 12 at the desired level of the upper extremity of the vapor blanket 22. The thermostatic controller 52 comprises a conventional temperature controller, and it is connected to the thermocouple 50 and to the heater coils 48 for energizing and deenergizing the coils 48 in order to maintain the upper extremity of the vapor blanket 22 at substantially the level of the thermocouple 50. In this connection, the thermocouple 50 is effectively operative for sensing the presence of the vapor blanket 22 since the vapor blanket 22 is normally maintained at the temperature of the boiling point of the heat transfer medium 18, whereas the areosol layer, which is present in the housing 12 above the upper extremity of the vapor blanket 22 is normally at a substantially lower temperature level than the temperature of the vapor blanket 22, since the aerosol is not in vapor-liquid equilibrium with the liquid heat transfer medium 18. Accordingly, the thermocouple 50 is effectively responsive to the presence or absence of the vapor blanket 22 at the level of the thermocouple 50 for controlling the upper level of the vapor blanket 22. In other words, when the temperature sensed by the thermocouple 50 is approximately equal to the temperature of the vapor blanket 22 (the boiling point of the heat transfer medium 18), the controller 52 is operative for deenergizing the heating coils 48; whereas, when the temperature sensed by the thermocouple 50 is significantly less than the temperature of the vapor blanket 22, the controller 52 is operative for energizing the heating coils 48 to raise the upper level of the vapor blanket 22. The thermocouple 50 is positioned at a level in the housing 12 which is below the upper extremities of both the inlet opening 12a and the outlet opening 12b so that the upper level of the vapor blanket 22 is maintained below the upper extremities of these openings in order to provide open communication between the interior of the housing 12 and the surrounding atmosphere through both the inlet section 14 and the outlet section 16.

The recovery section 24 is operative for applying a slight vacuum to the vessel 12 so that during normal operation of the apparatus 10 air is continually drawn slowly inwardly into the vessel 12 through the inlet tunnel 14 and the outlet tunnel 16, and the recovery section 24 is further operative for recovering any vaporized heat transfer medium which is withdrawn with the air from the vessel 12. The recovery section 24 comprises a substantially closed recovery housing 54, an exhaust pipe 56, a column assembly generally indicated at 58, and an exhaust fan 60. The housing 54 includes an upper recovery section 62 and a lower reservoir section 64 having a bottom outlet 66 and a standpipe outlet 68. The exhaust pipe 56 is connected to the vessel 12 at the outlet opening 32, and it is operative for providing communication between the interior of the vessel 12 and the recovery housing 54; and the exhaust fan 60 is operative through the column assembly 58 for applying a slight vacuum to the interior of the recovery housing 54 so that a small quantity of air with heat transfer medium intermixed therewith is constantly withdrawn from the vessel 12 through the exhaust pipe 56. The column assembly 58 comprises an inner water supply column 72 having a plurality of radially outwardly extending pins 74 thereon and an outer column 76 which is positioned in spaced relation around the column 72 so that the pins 74 extend between the two columns 72 and 76. The upper extremity of the outer column 76 is connected to a housing surrounding the exhaust fan 60 so that the column assembly 58 effectively communicates with the exhaust fan 60, whereas the lower end of the outer column 76 is disposed in upwardly spaced relation to the level of the upper extremity of the standpipe 68. The water supply column 72 is connected to a water supply line 78 for supplying water 79 to the column assembly 58 so that the water spills out the upper end of the water supply column 72, gravitates downwardly between the two columns 72 and 76, and falls into the reservoir section 64 during normal operation of the recovery unit 24. In this regard, as the water 79 passes over the pins 74, it intimately contacts the air and heat transfer medium passing upwardly between the two columns 72 and 76, and the heat transfer medium becomes intermixed with the water so that it gravitates downwardly therewith into the reservoir section 64, whereas the air passes upwardly to the exhaust fan 60. The reservoir section 64 is operative for collecting the water 79 and liquid heat transfer medium 18 in separate phases so that the heat transfer medium 18 can be withdrawn from the reservoir section 64 through the outlet 66 and so that collected water 79 can spill over into the standpipe 68 and be withdrawn from the recovery section 24 during normal operations. In this regard, the standpipe 68 is positioned so that the upper extremity thereof is spaced downwardly from the lower extremity of the column assembly 58 in order to assure open access to the lower end of the column section 58. Accordingly, during operation of the apparatus 10, air and any of the heat transfer medium intermixed therewith (indicated by wavy arrows) is continuously withdrawn from the vessel 12 through the exhaust pipe 56 and withdrawn from the recovery housing 54 through the outer column 76 by the exhaust fan 60. As the water 79 is spilled from the water supply column 72, it falls over the pins 74 so that any of the heat transfer medium which is intermixed with the air becomes instead intermixed with the water 77 and gravitates downwardly with the water 79 into the reservoir section 64 where it naturally separates from the water 79 as a separate and distinct liquid phase. As a result, the heat transfer medium 18 can be withdrawn through the outlet 66 and recirculated into the lower section 36 of the vessel 12 as needed. On the other hand, the air which is drawn into the recovery housing 54 and upwardly between the water supply column 72 and the outer column 76 is exhausted to the atmosphere by the exhaust fan as essentially pure air.

The conveyor 26 preferably comprises a conventional conveyor having a stainless steel woven wire belt, and it extends through the inlet tunnel 14, the intermediate section 34 of the main vessel 12, and the outlet section 16 as indicated by the straight arrows. In this connection, the conveyor 26 is constructed so that it is operative for transporting the articles 28 so that they pass through the vapor blanket 22 in order to heat the articles 28 to a predetermined temperature with the vaporized heat transfer medium in the vapor blanket 22. The conveyor 26 preferably operates at a rate of between 1 and 100 in. per minute, and it is preferably adjustable within this range in a conventional manner.

Accordingly, during use and operation of the apparatus 10, the heater assembly 20 is energized to produce the vapor blanket 22 from the liquid heat transfer medium 18. The thermocouple 50 is operative for sensing the upper level of the vapor blanket 22, and the controller 52 is operative for controlling the heater assembly 20 to maintain the upper extremity of the vapor blanket 22 at a predetermined level. The exhaust fan 60 is operated to apply a slight vacuum to the main vessel 12 so that a small amount of air (indicated by wavy arrows) is constantly drawn inwardly through both the inlet section 14 and the outlet section 16. The air which is drawn into the main vessel 12 in this manner is withdrawn from the vessel 12 through the exhaust pipe 56 along with any vaporized heat transfer medium from the aerosol layer which has become intermixed with the air. The air and heat transfer medium which are withdrawn from the vessel 12 (indicated by wavy arrows) are then passed through the column assembly 58 to intermix the heat transfer medium with water, and the heat transfer medium and the water gravitate downwardly into the reservoir section 64, whereas the air passed upwardly to the exhaust fan 60. Accordingly, the air is exhausted as essentially pure air, whereas the heat transfer medium and water separate into two distinct liquid phases to allow recovery of essentially all of the heat transfer medium which was withdrawn from the vessel 12. Further, since the heat transfer medium is preferably essentially insoluable in water, the water is not contaminated and it can either be reused or withdrawn from the apparatus 10 as essentially pure water.

As the articles 28 are passed through the apparatus 10, they are preferably preheated with heaters (not shown) in the inlet section 14, and the preheated articles are then passed through the vapor blanket 22 where they are heated to the temperature of the vapor blanket 22 to effect a reflow of the solder on the articles. As the articles are then passed through the outlet section 16, any of the heat transfer medium on the articles is returned to the main vessel 12 with the air stream which is drawn inwardly through the outlet section 16. Hence, the articles 28 can be effectively heated in the vessel 12 by the vapor blanket 22, although the loss of vaporized heat transfer medium from the apparatus 10 is effectively eliminated. Further, because of the positive air flow through the apparatus 10, it is virtually impossible to accumulate moisture in the main vessel 12.

It is seen therefore that the instant invention provides an effective apparatus for heating articles utilizing a vaporized heat transfer medium. The heat transfer medium 18 is vaporizable to produce a vapor blanket 22 which can be effectively utilized for heating the articles 28. However, because of the inward flow of air through the inlet and outlet tunnels 14 and 16, respectively, and the manner in which heat transfer medium is recovered in the recovery section 24, the apparatus 10 is operative without significant losses of heat transfer medium. Further, because of the positive flow of air through the vessel 12, the apparatus 10 is operative without accumulating moisture in the vessel 12. As a result, the apparatus 10 can be run substantially more effectively and more economically than the heretofore available apparatus and it therefor represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for heating articles comprising a vessel having an inlet opening, an outlet opening and an exhaust opening therein, said inlet opening and said outlet opening being open to atmosphere, a quantity of vaporizable liquid transfer medium in said vessel, said transfer medium being vaporizable to produce a vapor having a density greater than that of air, means for heating said transfer medium to produce a vapor blanket of vaporized transfer medium in said vessel, means for controlling said vapor blanket to maintain the upper extremity thereof at a predetermined level in said vessel, at least a portion of each of said inlet opening, said outlet opening and said exhaust opening being disposed above said predetermined level, exhaust means for applying a partial vacuum to said vessel through said exhaust opening in order to withdraw air and any of said transfer medium intermixed therewith from said vessel and to draw air inwardly into said vessel through said inlet opening and said outlet opening, said exhaust means being the sole means for inducing the inward flow of air through said inlet opening and said outlet opening, and transport means for transporting said articles through said vessel so that they pass sequentially through said inlet opening, said vapor blanket and said outlet opening.

2. The apparatus of claim 1 further comprising recovery means for recovering any of said heat transfer medium intermixed with said air withdrawn from said vessel.

3. In the apparatus of claim 2, said heat transfer medium comprising a perfluorinated liquid heat transfer medium, said recovery means comprising means for intimately contacting said air and any of said heat transfer medium intermixed therewith with water to recover any of said heat transfer medium intermixed with said air.

4. In the apparatus of claim 2, said recovery means comprising spaced, substantially coaxial, inner and outer substantially upright columns, said outer column having substantially open upper and lower ends, said inner column having a substantially open upper end and means for supplying water to said inner column so that it spills out the open upper end thereof and passes between said inner and outer columns, said exhaust means drawing said air and any of said transfer medium intermixed therewith upwardly between said inner and outer columns to effect contact between said any of said transfer medium intermixed with said air and said water to thereby recover said any of said heat transfer medium intermixed with said air.

5. In the apparatus of claim 4, said recovery means further comprising a plurality of contact pins between said inner and outer columns for effecting increased contact between said any of said heat transfer medium intermixed with said air and said water.

6. In the apparatus of claim 1, said means for controlling said vapor blanket being operative for controlling said means for heating said heat transfer medium to maintain the height of said vapor blanket at said predetermined level.

7. The apparatus of claim 1 further comprising cooling means in said vessel above said predetermined level for containing said vapor blanket to further maintain the upper extremity thereof at said predetermined level and for cooling the portions of said vessel which are above said predetermined level.

8. In the apparatus of claim 7, said cooling means being disposed in closely upwardly spaced relation to said predetermined level.

9. In the apparatus of claim 7, said vessel comprising an upper portion which is disposed above said inlet opening and said outlet opening, said exhaust opening being dipsosed in said upper portion, said cooling means being operative for cooling said upper portion.

10. In the apparatus of claim 1, said liquid heat transfer medium comprising a perfluorinated liquid heat transfer medium.

11. The apparatus of claim 1 further comprising inlet and outlet tunnels communicating with said inlet and outlet openings, respectively, said inlet and outlet openings being open to atmosphere through said inlet and outlet tunnels, respectively, said inlet and outlet tunnels each including a segment in the longitudinal extent thereof which is entirely above said predetermined level.

12. An apparatus for heating articles comprising a vessel having an inlet opening, an outlet opening and an exhaust opening therein, said inlet opening and said outlet opening being open to atmosphere, a quantity of vaporizable liquid transfer medium in said vessel, said transfer medium being vaporizable to produce a vapor having a density greater than that of air, means for heating said transfer medium to produce a vapor blanket of vaporized transfer medium in said vessel, means for controlling said means for heating said heat transfer medium to maintain the upper extremity of said vapor blanket at a predetermined level in said vessel, at least a portion of each of said inlet opening, said outlet opening and said exhaust opening being disposed above said predetermined level, exhaust means for applying a partial vacuum to said vessel through said exhaust opening in order to withdraw air and any of said transfer medium intermixed therewith from said vessel and transport means for transporting said articles through said vessel so that they pass sequentially through said inlet opening, said vapor blanket and said outlet opening.

* * * * *